United States Patent
Wadhwa (10) Patent No.: US 10,078,016 B2
(45) Date of Patent: Sep. 18, 2018

(54) ON-DIE TEMPERATURE SENSOR FOR INTEGRATED CIRCUIT

(71) Applicant: FREESCALE SEMICONDUCTOR, INC., Austin, TX (US)

(72) Inventor: Sanjay K. Wadhwa, Noida (IN)

(73) Assignee: NXP USA, INC., Austin, TX (US)

(*) Notice: Subject to any disclaimer, the term of this patent is extended or adjusted under 35 U.S.C. 154(b) by 253 days.

(21) Appl. No.: 15/041,022

(22) Filed: Feb. 10, 2016

(65) Prior Publication Data

US 2017/0227409 A1    Aug. 10, 2017

(51) Int. Cl.
   *G01K 7/01*       (2006.01)
   *G01K 13/00*      (2006.01)
   *G05F 3/26*       (2006.01)

(52) U.S. Cl.
   CPC ............. *G01K 7/015* (2013.01); *G01K 13/00* (2013.01); *G05F 3/267* (2013.01)

(58) Field of Classification Search
   CPC ........................... G01K 2219/00; G01K 7/015
   See application file for complete search history.

(56) References Cited

U.S. PATENT DOCUMENTS

| | | | |
|---|---|---|---|
| 5,982,221 A | 11/1999 | Tuthill | |
| 6,078,208 A * | 6/2000 | Nolan | G01K 7/01 327/512 |
| 6,297,761 B1 * | 10/2001 | Barrenscheen | H03M 1/50 341/118 |
| 7,173,407 B2 * | 2/2007 | Marinca | G05F 3/262 323/316 |
| 7,702,488 B2 * | 4/2010 | Moser | G01L 9/12 340/442 |
| 8,596,864 B2 | 12/2013 | Peterson | |
| 9,709,445 B2 * | 7/2017 | Caldara | G01K 7/01 |
| 9,715,913 B1 * | 7/2017 | Yin | G11C 7/222 |
| 2010/0111137 A1 | 5/2010 | Chen et al. | |
| 2015/0177772 A1 | 6/2015 | Casagrande et al. | |
| 2015/0355037 A1 * | 12/2015 | Cottin | G01K 7/32 374/1 |

* cited by examiner

*Primary Examiner* — Clayton E Laballe
*Assistant Examiner* — Leon W Rhodes, Jr.
(74) *Attorney, Agent, or Firm* — Charles E. Bergere (57) ABSTRACT

An on-die temperature sensor measures temperature during a temperature-measurement session. A PTAT (proportional-to-absolute-temperature) generator generates an analog PTAT voltage that is dependent on temperature. A ramp generator generates a changing, analog ramp voltage whose rate of change is dependent on the PTAT voltage, such that the rate of change of the ramp voltage is dependent on the temperature. A comparator compares the ramp voltage to a reference voltage to detect termination of the temperature-measurement session. A counter generates a count value based on the duration of the temperature-measurement session, where the count value is mapped to the measured temperature using a lookup table. The PTAT generator has (i) two npn-type bipolar devices that generate a base-to-emitter voltage difference that is dependent on temperature and function as an amplifier input stage and (ii) circuitry to generate base currents for the bipolar devices to avoid current loading at the PTAT output.

10 Claims, 8 Drawing Sheets

ON-DIE TEMPERATURE SENSOR FOR INTEGRATED CIRCUIT

BACKGROUND

The present invention relates to integrated circuits and, more particularly, to a temperature sensor circuit.

Many systems-on-chips (SoCs) require elaborate thermal management, and so integrated or on-die temperature sensors are implemented to measure die temperatures. Using the temperature value provided by the temperature sensor, many decisions can be performed such as increasing or decreasing the operating frequency and/or voltage and gracefully shutting down the SoC if the temperature exceeds a predetermined reliability limit in order to prevent critical failures of the system.

The accuracy of an on-die temperature sensor is defined as the difference between the actual die temperature and the temperature sensor measurement. The smaller the measurement error, the higher the accuracy of the sensor.

A typical on-die temperature sensor may include (i) a PTAT (proportional to absolute temperature) generator that generates an analog PTAT voltage that ideally is linearly proportional to temperature and (ii) an analog-to-digital (A/D) converter that converts the analog PTAT voltage level to a digital value that can be converted to temperature based on a predetermined mapping stored in memory in a look-up table (LUT).

Figure 1:
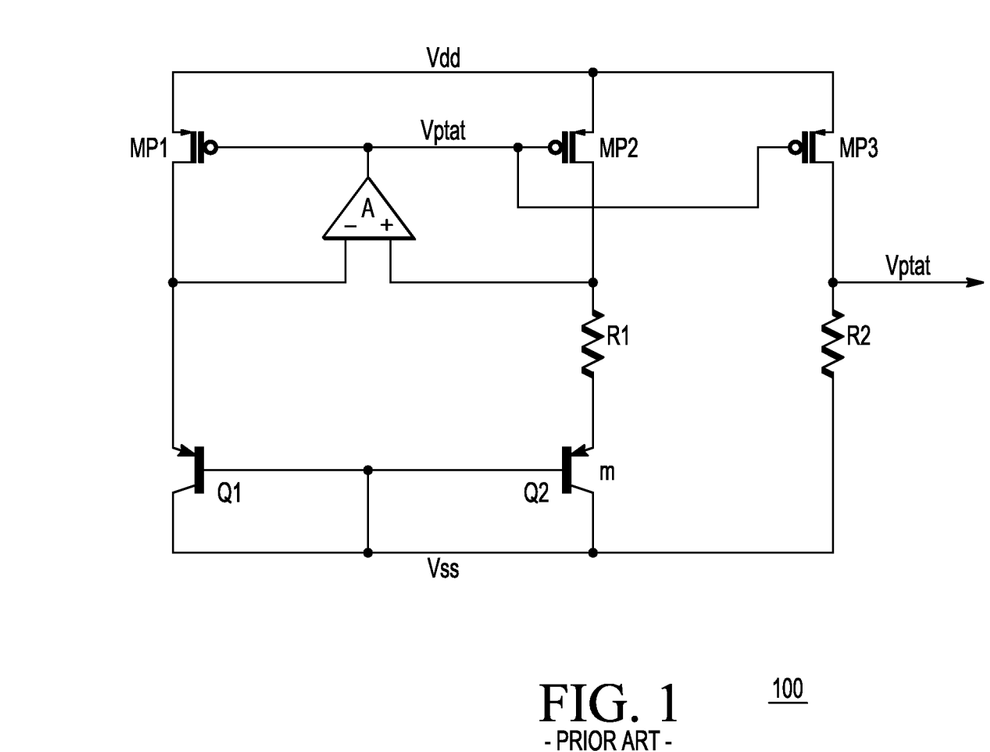
FIG. 1 is a schematic circuit diagram of a conventional PTAT generator of the prior art.

FIG. 1 is a schematic circuit diagram of a conventional PTAT generator 100. As shown in FIG. 1, the PTAT generator 100 has an operational amplifier (opamp) A whose two (positive and negative) inputs are generated by two current-mirrored legs configured in a negative-feedback arrangement. The first leg comprises a first PMOS (p-type metal oxide semiconductor) transistor MP1 in series with a first pnp-type bipolar transistor device Q1, and the second leg comprises a second PMOS transistor MP2 in series with a first resistor R1 and a second pnp-type bipolar transistor device Q2, which is m times larger than the device Q1, where m>1. Note that the transistors MP1 and MP2 are (ideally) the same size, such that the currents flowing through the first and second legs will be (ideally) the same.

As a result of the negative-feedback arrangement in the PTAT generator 100, the voltages at the two inputs to the opamp A will be driven to the same level. Since the bases of the pnp devices Q1 and Q2 are tied together to ground (Vss), and since Q2 is m times larger than Q1, the emitter voltage of Q2 will be lower than the emitter voltage of Q1. Since the voltage level at the opamp's negative input is equal to the Q1 emitter voltage, and since the voltage level at the opamp's positive input is driven to that same Q1 emitter voltage level, the voltage across resistor R1 will be equal to the difference between the Q1 and Q2 emitter voltage levels, which is equal to the base-to-emitter voltage difference $\Delta V_{BE}$ between Q1 and Q2.

For equal levels of current flow, the base-to-emitter voltage difference $\Delta V_{BE}$ between Q1 and Q2 is given by Equation (1) as follows:

$$\Delta V_{BE} = V_T * \ln(m) \qquad (1)$$

where $V_T$ is the voltage equivalent of temperature given by Equation (2) as follows:

$$V_T = k*T/q, \qquad (2)$$

where k is the Boltzmann constant, T is temperature in degrees Kelvin, and q is the fundamental charge constant.

As shown in FIG. 1, the PTAT generator 100 also comprises a third, current-mirrored leg comprising a third PMOS transistor MP3 in series with a second resistor R2, where the size of MP3 is (ideally) identical to the sizes of MP1 and MP2, such that the current flowing through the third leg is (ideally) identical to the currents flowing through the first and second legs, and where the resistances of R1 and R2 may be (but do not have to be) different. As such, the PTAT voltage Vptat presented at the output of the PTAT generator 100 is given by Equation (3) as follows:

$$V_{ptat} = (R_2 * \Delta V_{BE})/R_1 = (R_2 * V_T * \ln(H))/R_1 = (R_2 * k * T * \ln(m))/(R_1 * q) \qquad (3)$$

where $R_1$ and $R_2$ are the respective resistances of the resistors R1 and R2. In other words, according to equation (3), the PTAT voltage $V_{ptat}$ generated by PTAT generator 100 of FIG. 1 is (ideally) a linear function of the temperature T and a constant. Note that, although the resistance levels $R_1$ and $R_2$ may vary with temperature, their ratio $R_2/R_1$ should be substantially constant with temperature and process variation.

In an ideal implementation, the sizes of the three PMOS devices MP1, MP2, and MP3 are exactly equal. In a real-world implementation, however, there will be random transistor mismatches (such as random variations in transistor width, length, threshold voltages, mobility, etc.) that result in differences between the current levels in the three legs and an offset at the input to the opamp A, all of which will result in non-linearity in the response of the PTAT generator 100 to changes in temperature. As such, in order for an on-die temperature sensor employing the PTAT generator 100 of FIG. 1 to operate with sufficient precision for some SoC applications, the operations of the PTAT generator 100 need to be calibrated during factory testing (also referred to as trimming) at multiple different temperature levels, e.g., at high temperature (e.g., 125 C), at low temperature (e.g., −40 C), and again at room temperature (e.g., 25 C) in order to generate the LUT used to map the A/D converter output levels to temperature. This requirement for multi-temperature trimming increases the test time and cost.

Another disadvantage of conventional on-die temperature sensors is the need to implement an A/D converter, which can also increase the cost of the SoC.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In one embodiment, an article of manufacture comprises a temperature sensor that measures temperature during a temperature-measurement session. The temperature sensor comprises a PTAT (proportional to absolute temperature) generator that generates an analog PTAT voltage that is dependent on the temperature; a ramp generator that generates a changing, analog ramp voltage whose rate of change is dependent on the PTAT voltage, such that the rate of change of the ramp voltage is dependent on the temperature; a comparator that compares the ramp voltage to a reference voltage to detect termination of the temperature-measurement session; and a counter that generates a count value based on duration of the temperature-measurement session, where the count value indicates the measured temperature.

Another embodiment is a method for measuring temperature during a temperature-measurement session having a beginning and an end. The method comprises (a) initializing a ramp voltage and a counter value at the beginning of the temperature-measurement session, where the counter value is incremented by a counter during the temperature-measurement session; (b) driving the ramp voltage to change during the temperature-measurement session based on a PTAT voltage generated by a PTAT generator; (c) comparing the ramp voltage to a reference voltage to detect when the ramp voltage reaches the reference voltage indicating the end of the temperature-measurement session; and (d) mapping the counter value at the end of the temperature-measurement session to a measured temperature value.

In yet another embodiment, the present invention provides an article of manufacture that comprises a PTAT generator that generates an analog PTAT voltage that is dependent on temperature. The PTAT generator comprises (i) an amplifier stage whose input stage comprises differently sized first and second npn transistor devices whose emitters are tied together such that their respective first and second base voltages have different levels and (ii) an output stage that generates the PTAT voltage based on current flowing through a first resistor having the first and second base voltages applied across the first resistor.

Figure 2:
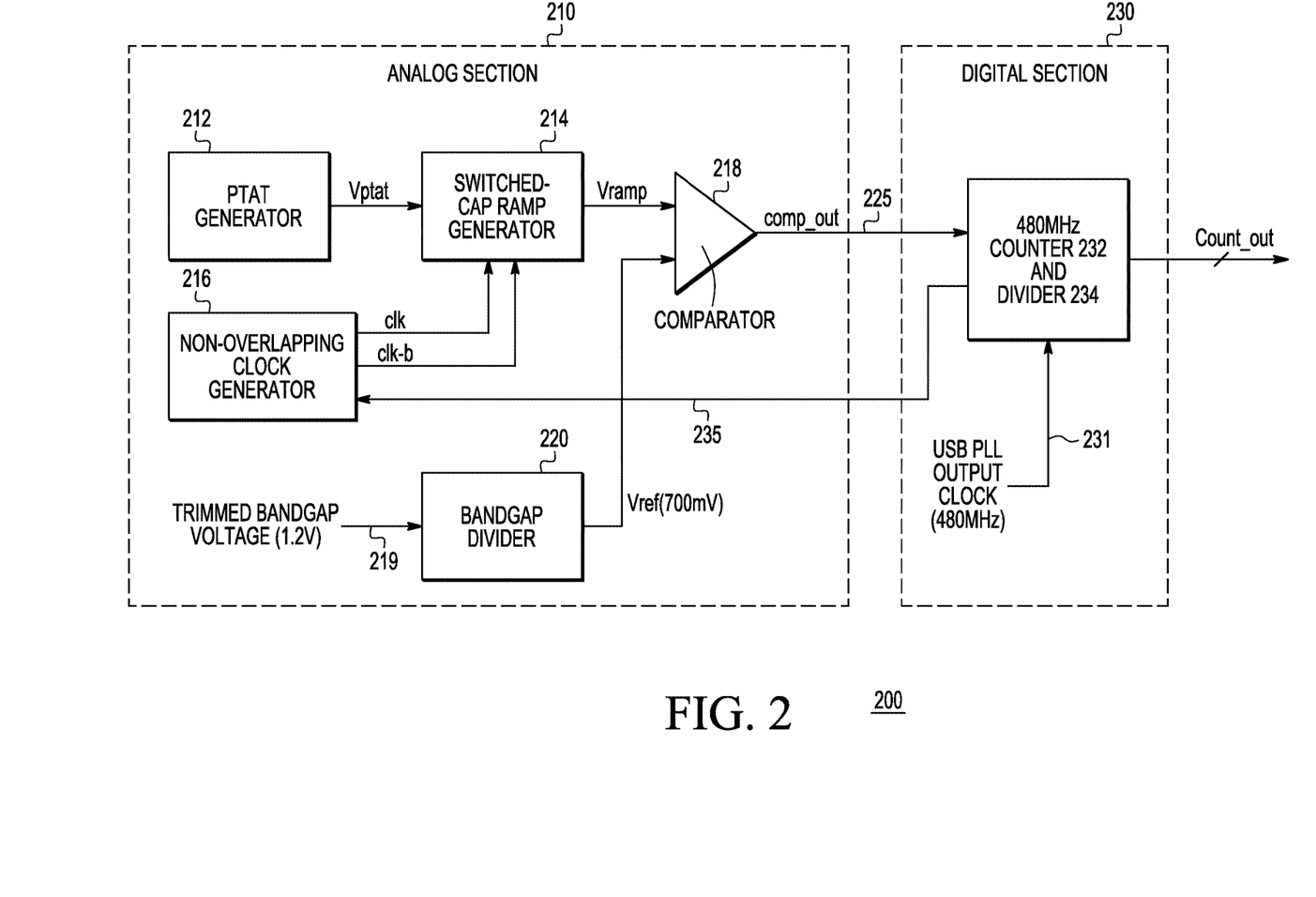
FIG. 2 is a schematic block diagram of an on-die temperature sensor according to one embodiment of the invention.

Referring now to FIG. 2, a schematic block diagram of an on-die temperature sensor 200 according to one embodiment of the invention is shown. The on-die temperature sensor 200 implements a sequence of temperature-measurement sessions, during each of which the temperature sensor 200 (i) measures the temperature of the integrated circuit on which it is implemented and (ii) outputs a digital value Count_out, whose magnitude is a function of the measured temperature. Although not shown in FIG. 2, the on-die temperature sensor 200 will typically be implemented as part of a larger integrated circuit, such as an SoC, having many other circuits. One of those other circuits may be a digital processor (not shown) that converts the digital value Count_out into a temperature, e.g., in degrees Celsius, based on a mapping stored in a look-up table in the digital processor.

As shown in FIG. 2, the temperature sensor 200 comprises an analog section 210 and a digital section 230. The digital section 230 includes a counter 232 that starts counting from zero at the start of each temperature-measurement session of the temperature sensor 200 and stops counting at the end of that temperature-measurement session, where the digital value Count_out is the final counter value at the end of the session. In the implementation shown in FIG. 2, the counter 232 is driven by a 480-MHz clock signal 231, such as is typically generated by a conventional universal serial bus (USB) phase-locked loop (PLL) output clock. Those skilled in the art will understand that the invention can be implemented using other suitable clock generators and/or other suitable clock frequencies.

As also shown in FIG. 2, the digital section 230 also includes a divider 234 that divides down the clock signal 231 to a lower-frequency clock signal 235 that is used to drive the analog section 210. In one possible implementation, the divider 234 divides down the 480-MHz clock signal 231 by a factor of 24 to generate a 20-MHz clock signal 235, although, in other implementations, other suitable frequencies may be employed.

Note that the digital section 230 may also include the processor that maps the digital value Count_out to the corresponding measured temperature value based on the stored LUT.

As shown in FIG. 2, the analog section 210 comprises a high-speed comparator 218 that compares a ramp voltage Vramp (generated by a switched-capacitor ramp generator 214) to a reference voltage Vref (generated by a bandgap divider 220). In one possible implementation, at the start of a temperature-measurement session, the ramp voltage Vramp is at 0 volts (i.e., ground) and ramps up at a rate of voltage change (as explained further below) that is directly dependent on temperature. When the ramp voltage Vramp reaches and just exceeds the reference voltage Vref, the output signal 225 (at node comp_out) generated by the comparator 218 will flip (i.e., from high to low or from low to high, depending on the particular implementation), thereby signaling to the digital section 230 the end of the temperature-measurement session.

Since the rate of voltage change in the ramp voltage Vramp is directly dependent on temperature, the higher the temperature, the quicker will the ramp voltage Vramp reach the reference voltage Vref, the shorter will be the temperature-measurement session, and the lower will be the digital value Count_out. As such, the digital value Count_out will be inversely proportional to temperature. The higher the temperature, the lower the digital value Count_out, which relationship will be taken into account by the LUT mapping.

Figure 3:
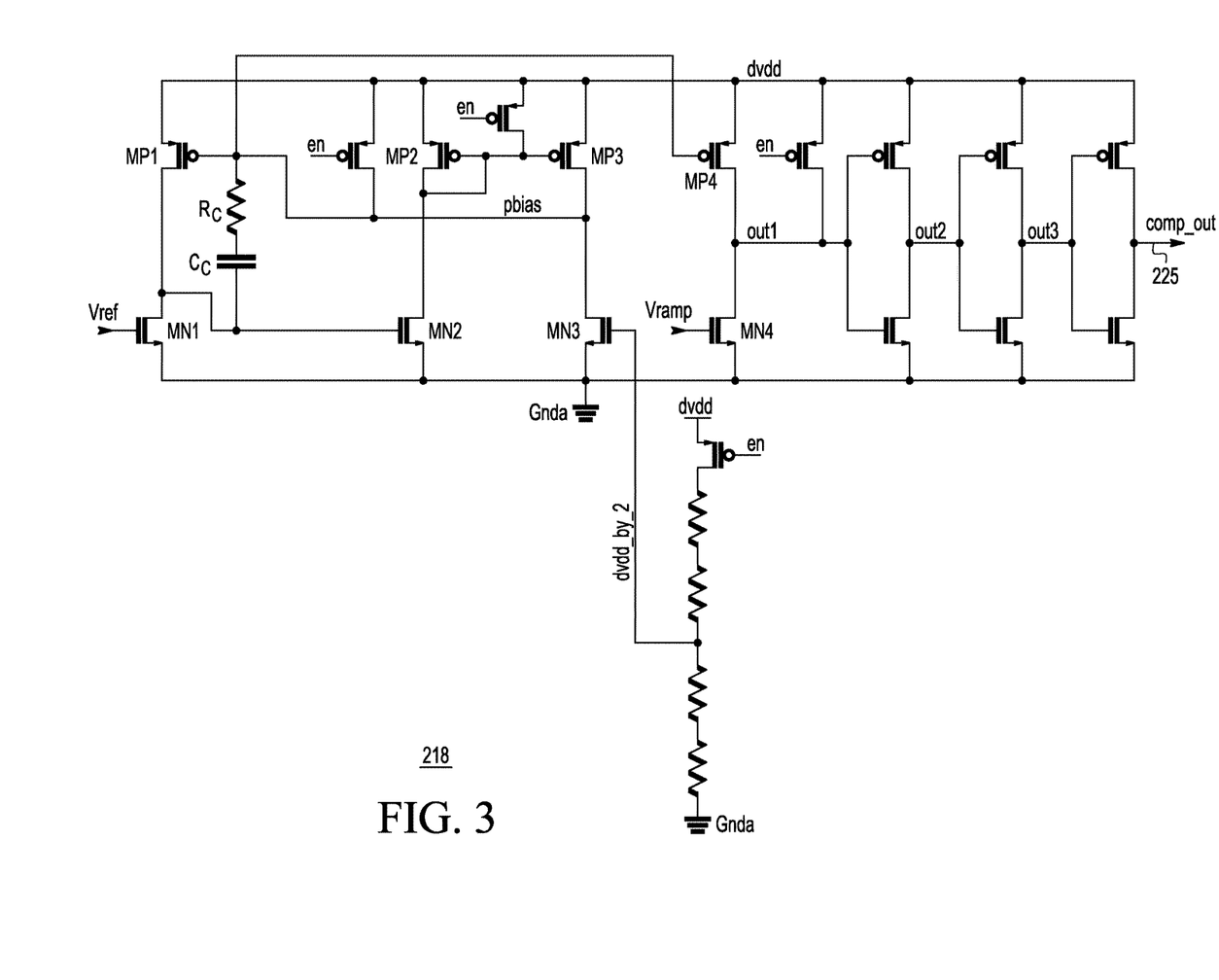
FIG. 3 is a schematic circuit diagram of a high-speed, self-biased, inverter-based comparator of FIG. 2.

FIG. 3 is a schematic circuit diagram of the high-speed, self-biased, inverter-based comparator 218 of FIG. 2, which can operate at relatively low power supply voltages. The comparator 218 is further described in U.S. Pat. No. 9,209, 790 B1, the teachings of which are incorporated herein by reference. As shown in FIG. 3, the reference voltage Vref and the ramp voltage Vramp are applied to the comparator 218, which in turn generates the comparator output signal 225. Under ideal conditions, the voltage at node out1 is set at the voltage level of the resistor-divider voltage dvdd_by_2 when Vramp=Vref. As Vramp slightly exceeds Vref, the voltage at the node out1 goes low, and the comparator output signal 225 is driven high. The inverter-based design of the comparator 218 provides high gain and high bandwidth. The comparator 218 can work with a low-voltage digital supply (e.g., 1.1V or greater), because there are only two series-connected transistors in each branch.

In particular, the reference voltage Vref is applied at the gate of nMOS transistor device MN1 and the ramp voltage Vramp is applied at the gate of nMOS transistor device MN4. pMOS transistor devices MP2 and MP3 form a current mirror with ratio 1:1. Due to this, the gate voltages of nMOS transistor devices MN2 and MN3 become equal. The feedback loop adjusts the voltage at node pbias such that pMOS transistor device MP1 supports the current required by MN1 while keeping the drain voltage at half the digital supply voltage (dvdd_by_2). nMOS transistor device MN4 and pMOS transistor device MP4 form an inverter, which is a replica of the inverter formed by MN1 and MP1. Thus, when Vramp is equal to Vref, the voltage at node out1 becomes equal to dvdd_by_2, which is close to the threshold voltage of the subsequent inverter. When Vramp starts ramping up from 0V, the voltage at node out1 is high, and the voltage level of the comparator output signal 225 at node comp_out is low. As soon as Vramp slightly exceeds Vref, due to high inverter gain, the voltage at node out1 goes low, and the voltage at node comp_out goes high. The reverse happens when Vramp starts ramping down towards 0V.

In the particular implementation shown in FIG. 2, the reference voltage Vref is about 700 mV and is generated by the bandgap divider 220, which is itself driven by a trimmed bandgap voltage signal 219 of 1.2V generated by a conventional bandgap voltage generator (not shown). Other implementations may employ other suitable reference voltage levels. In general, to ensure proper operation of the comparator 218, the reference voltage Vref should not be too low or too high. In particular, if the reference voltage Vref is too low (e.g., below or nearly equal to the threshold voltage of the nMOS transistor MN1 (e.g., about 400 mV)), then the current in the branch of the comparator 218 composed of devices MN1 and MP1 will be very low, which will cause high delay and comparator offset. On the other hand, if the reference voltage Vref is too high (e.g., close to the supply voltage (e.g., about 1.1V)), then it will be difficult to keep the transistors in the comparator 218 in their saturation regions and comparator performance will suffer.

In FIG. 3, resistor $R_C$ and capacitor $C_C$ provide compensation resistance and capacitance, respectively, that ensure stability of the circuit.

Figure 4:
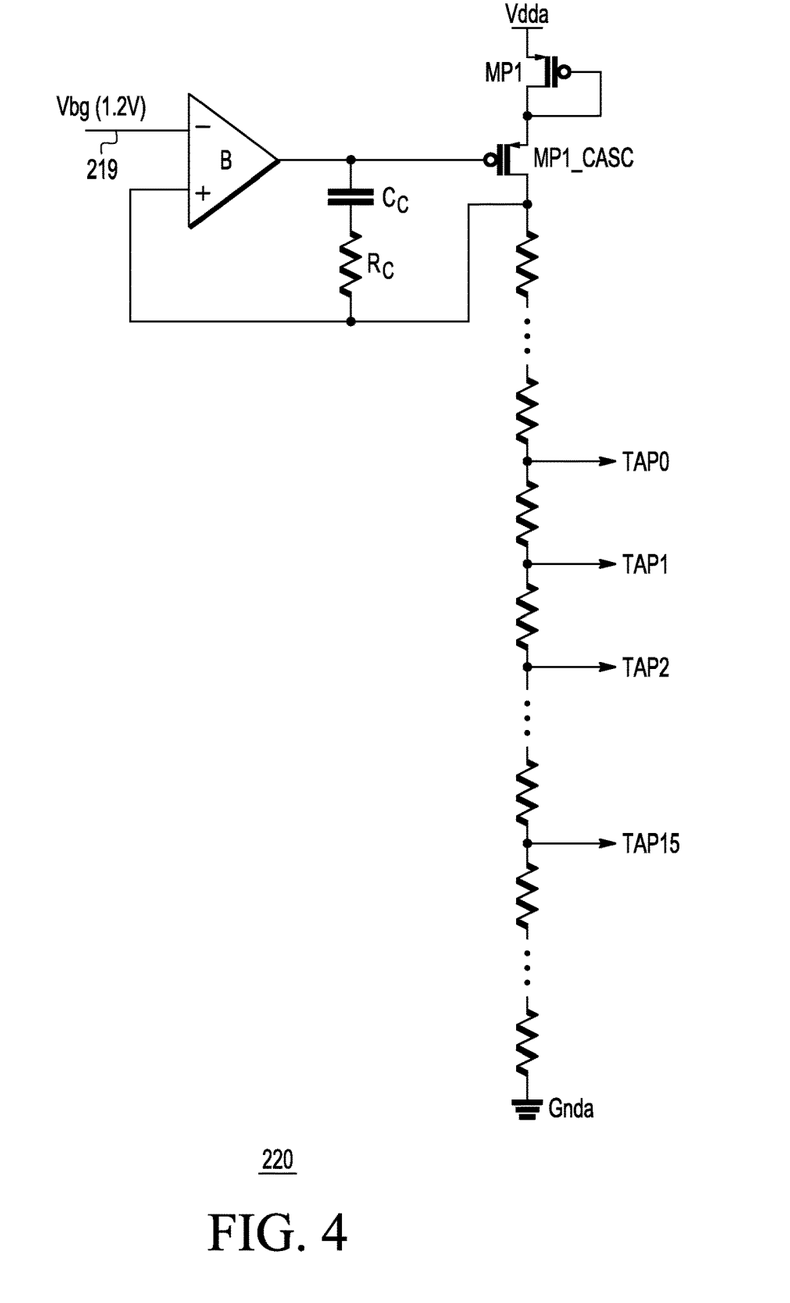
FIG. 4 is a schematic circuit diagram of an embodiment of a bandgap divider of FIG. 2 in accordance with the present invention.

FIG. 4 is a schematic circuit diagram of the bandgap divider 220 of FIG. 2 according to one possible implementation of the invention. As shown in FIG. 4, the bandgap divider 220 comprises an opamp B configured in a negative-feedback arrangement that drives the voltage at the opamp's positive input towards the bandgap voltage 219. The resistances of the stack of resistors in the bandgap divider 220 are selected such that the voltage levels at the sixteen taps TAP0-TAP15 (ideally) within the stack of resistors range from about 670 mV to about 730 mV in ~4 mV increments. In this way, the bandgap divider 220 makes available a number of different output voltage levels, any one of which may be selected to be the reference voltage Vref applied to the comparator 218 of FIG. 2 (using conventional multiplexing circuitry that is not shown in the figures).

In FIG. 4, resistor $R_C$ and capacitor $C_C$ provide compensation resistance and capacitance, respectively, that ensure stability of the circuit.

Figure 5:
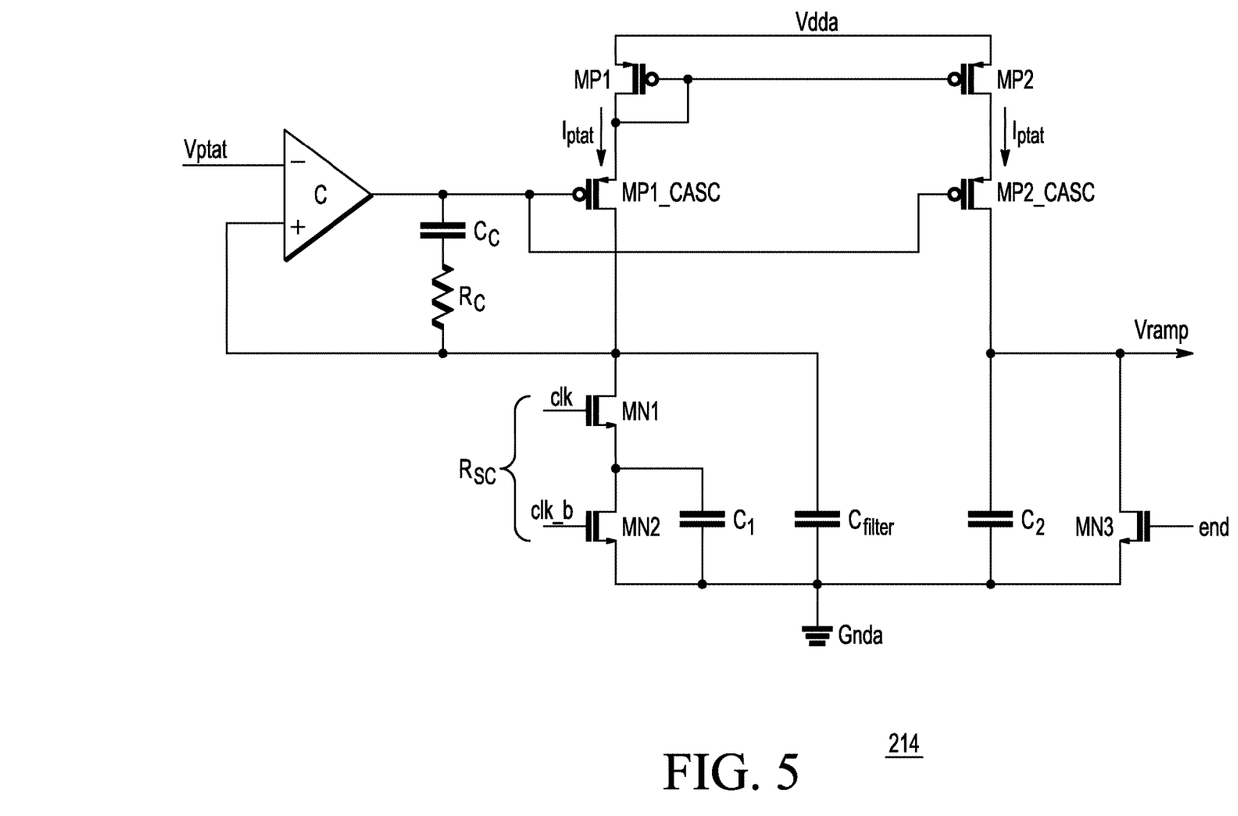
FIG. 5 is a schematic circuit diagram of a switched-capacitor ramp generator of FIG. 2.

FIG. 5 is a schematic circuit diagram of the switched-capacitor ramp generator 214 of FIG. 2. The ramp generator 214 generates a ramp voltage Vramp that increases over time at a rate of voltage change that is directly dependent on the PTAT voltage $V_{ptat}$ generated by the PTAT generator 212 of FIG. 2. The larger the level of $V_{ptat}$, the greater the rate of increase of Vramp.

As shown in FIG. 5, the ramp generator 214 comprises an opamp C configured in a negative-feedback arrangement such that, in the steady state, the average value of the voltage at the opamp's positive input is driven to be equal to the PTAT voltage $V_{ptat}$, which is applied to the opamp's negative input.

The ramp generator 214 also comprises two current-mirrored legs. The first leg comprises the pMOS transistor devices MP1 and MP1_CASC and a switched-capacitor resistance $R_{SC}$. The switched-capacitor resistance $R_{SC}$ is realized by the capacitor C1 and two nMOS transistor devices MN1 and MN2 that are respectively driven by non-overlapping (20-MHz) clock signals clk and clk_b generated by the conventional, non-overlapping clock generator 216 of FIG. 2 based on the (20-MHz) clock signal 235. As non-overlapping clock signals, clk and clk_b are not both high at the same time. In particular, clk transitions from high to low before clk_b transitions from low to high, and clk_b transitions from high to low before clk transitions from low to high. The clock signals clk and clk_b may be characterized as complementary clock signals having duty cycles of (e.g., slightly) less than 50%.

The capacitor C1, as switched by the devices MN1 and MN2, functions as a resistor whose effective resistance $R_{SC}$ is given by Equation (4) as follows:

$$R_{SC}=1/fC_1 \quad\quad\quad (4)$$

where f is the frequency of clk and clk_b, and $C_1$ is the capacitance of the capacitor C1.

The capacitor $C_{filter}$ removes the high-frequency components at the opamp's positive input that are generated due to the periodic switching of the devices MN1 and MN2.

The second leg of the ramp generator 214 comprises the pMOS transistor devices MP2 and MP2_CASC and the capacitor C2. The sizes of MP2 and MP2_CASC are (ideally) the same as the sizes of MP1 and MP1_CASC, respectively, such that the current $I_{ptat}$ flowing through the first leg is mirrored as the same current $I_{ptat}$ flowing through the second leg. Example values for the capacitances $C_1$, $C_2$, and $C_{filter}$ are 1.13 pf, 117.25 pf, and 37.7 pf, respectively.

As shown in FIG. 5, the ramp generator 214 includes an nMOS pull-down transistor device MN3 that is turned on to drive the ramp voltage Vramp to ground (i.e., zero volts) before the beginning of the next temperature-measurement session. At the start of the temperature-measurement session, MN3 is turned off, allowing the ramp voltage Vramp to rise over time.

Since the voltage at the opamp's positive input is driven towards the PTAT voltage $V_{ptat}$ applied to the opamp's negative input, the current $I_{ptat}$ is given by Equation (5) as follows:

$$I_{ptat}=V_{ptat}/R_{SC} \quad\quad\quad (5)$$

Since the second leg mirrors the current in the first leg, the current $I_{ptat}$ can also be given by Equation (6) as follows:

$$I_{ptat} = C_2 * \frac{dVramp}{dt}, \quad (6)$$

where $C_2$ is the capacitance of the capacitor C2, and $$\frac{dVramp}{dt}$$

is the rate of voltage change of the ramp voltage Vramp. Solving Equation (6) for $$\frac{dVramp}{dt}$$

and applying Equations (4) and (5) yields Equation (7) as follows:

$$\frac{dVramp}{dt} = \frac{V_{ptat} * f * C_1}{C_2} \quad (7)$$

According to Equation (7), the rate $$\frac{dVramp}{dt}$$

or voltage change of the ramp voltage Vramp is (ideally) a linear function of the PTAT voltage $V_{ptat}$ and a constant.

In FIG. 5, resistor $R_C$ and capacitor $C_C$ provide compensation resistance and capacitance, respectively, that ensure stability of the circuit.

Figure 6A:
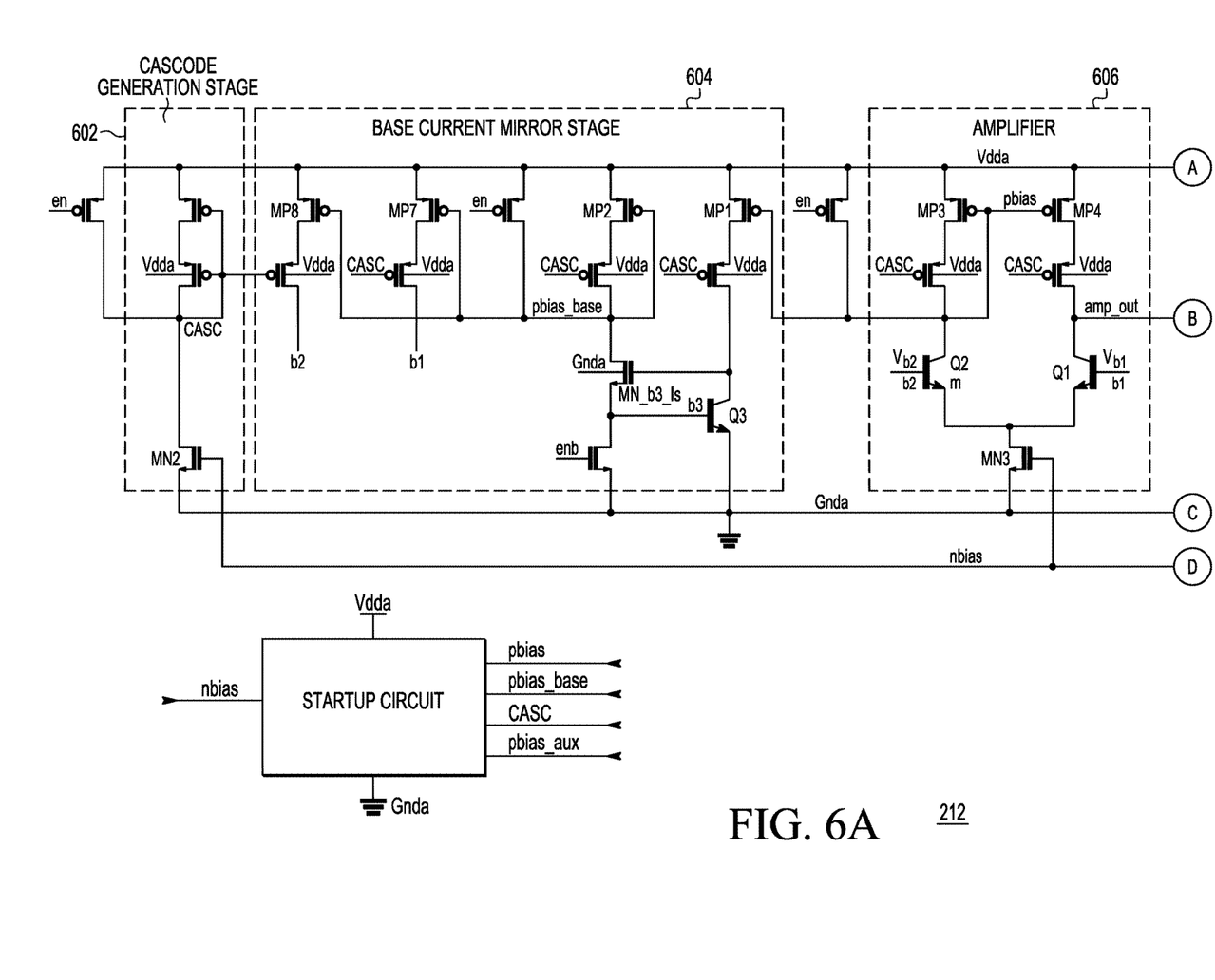
FIGS. 6A and 6B are a schematic circuit diagram of a PTAT generator of FIG. 2.
Figure 6B:
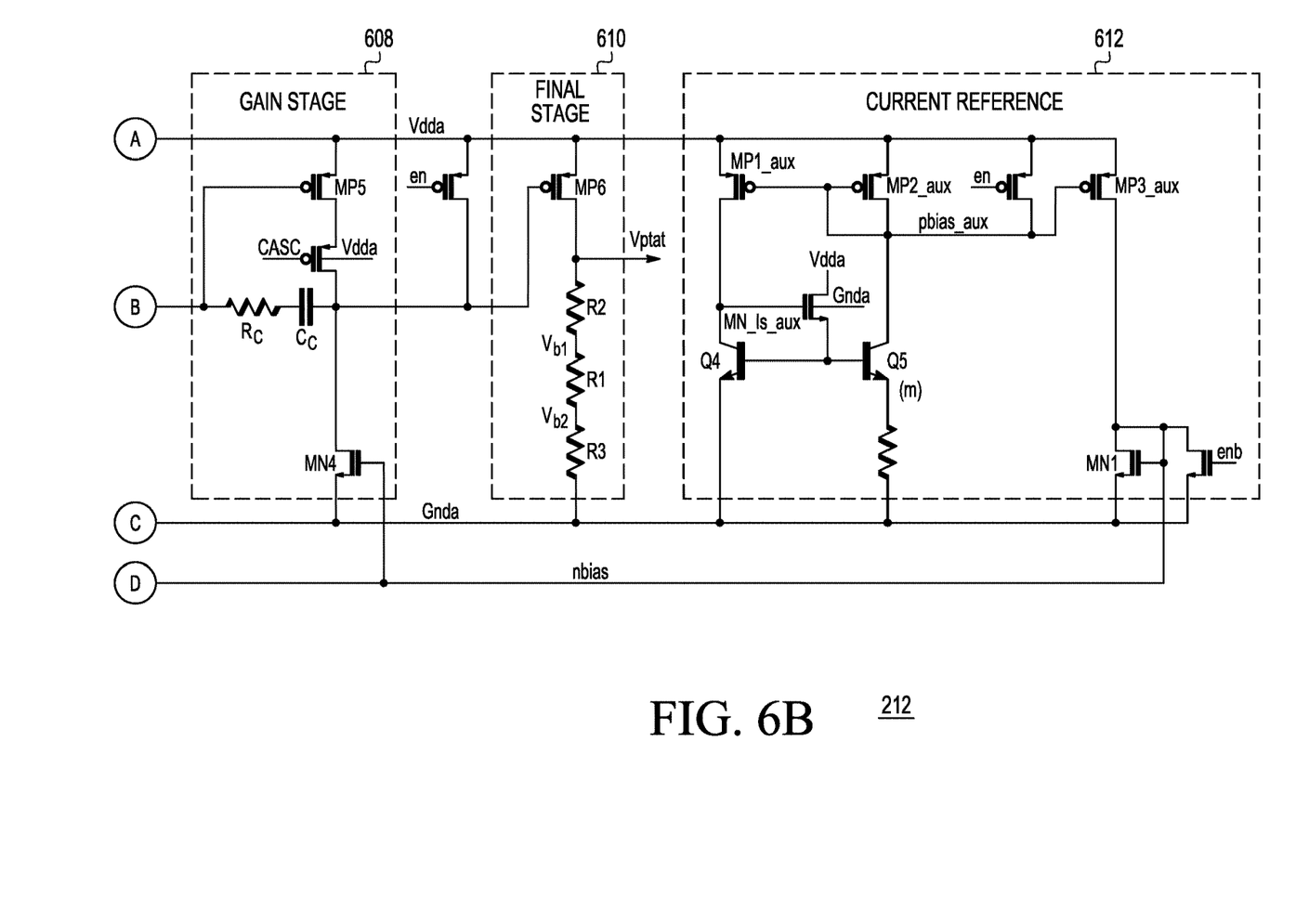

FIGS. 6A-6B are a schematic circuit diagram of the PTAT generator 212 of FIG. 2, which generates the temperature-dependent PTAT voltage $V_{ptat}$. Like many conventional PTAT generators, the PTAT generator 212 comprises: an amplifier stage 606 that generates an amplifier output signal amp_out; a gain stage 608 that amplifies the amplifier output signal amp_out in a conventional manner, where resistor $R_C$ and capacitor $C_C$ provide compensation resistance and capacitance, respectively, that ensure stability of the circuit; an output stage 610 that generates the PTAT voltage $V_{ptat}$; a current-reference stage 612 that generates reference currents for the PTAT generator 212 in a conventional manner; and a cascode-generation stage 602 that provides the gate voltage CASC to the cascode transistors in other stages to improve the current mirroring in a conventional manner.

The PTAT generator 212 of FIGS. 6A-6B differs from conventional PTAT generators in at least the following ways. First, the architecture and manner in which the amplifier stage 606 generates the ptat voltage; second, the architecture and manner in which the ptat voltage generated by the amplifier stage 606 is applied in the final stage 610; and third the presence of a base-current mirror stage 604 that generates the base currents for the two bipolar devices Q1 and Q2 in the amplifier stage 606.

Regarding the amplifier stage 606, the two differently sized, bipolar transistor devices Q1 and Q2 are npn-type devices that have their emitters tied together and to the ground (Gnda) via nMOS bias transistor device MN3, which is turned on during normal operations of the PTAT generator 212. This is very different from the prior-art PTAT generator 100 of FIG. 1, which had two differently sized, pnp-type devices Q1 and Q2 with their bases tied together and to ground.

In addition, in the PTAT generator 212 of FIGS. 6A-6B, the two bipolar devices Q1 and Q2 form the input (gain) stage of the amplifier 606. This is very different from the prior art PTAT generator 100 of FIG. 1, in which the two bipolar devices Q1 and Q2 are external to and generate the inputs to the opamp A, whose input stage is typically implemented using MOS devices (not shown in FIG. 1).

Thus, in the PTAT generator 212 of FIGS. 6A-6B, the two differently sized, npn devices Q1 and Q2 perform the dual functions of (i) generating the base-to-emitter voltage difference $\Delta V_{BE}$ and (ii) operating as the amplifier input stage. As in the prior-art PTAT generator 100 of FIG. 1, Q2 is m times larger than Q1, and the pMOS devices MP3 and MP4 of the two current-mirrored legs of the amplifier stage 606 are of equal size, such that the currents flowing through those two legs are equal. In the PTAT generator 212 of FIGS. 6A-6B, however, because the emitters of Q1 and Q2 are tied together, the difference $\Delta V_{BE}$ between the base-to-emitter voltage $V_{BE}$ of Q1 and the $V_{BE}$ of Q2 manifests itself as a difference between the base voltage $V_{b1}$ at base node b1 of Q1 and the base voltage $V_{b2}$ at base node b2 of Q2, with $V_{b1}$ being greater than $V_{b2}$ because Q2 is larger than Q1.

As shown in FIGS. 6A-6B, the base nodes b1 and b2 of the amplifier 606 are connected to apply the base voltages $V_{b1}$ and $V_{b2}$ across the resistor R1 in the final stage 610, and the final PTAT voltage $V_{ptat}$ appears at the node between the pMOS transistor device MP6 and the resistor R2.

Because bipolar devices Q1 and Q2 are current-controlled devices that draw current through their base nodes, the PTAT generator 212 of FIGS. 6A-6B is implemented with the base-current mirror stage 604, which is connected and configured to generate the currents drawn by the bipolar devices Q1 and Q2, respectively. In this way, the voltages at the base nodes b1 and b2 applied across the resistor R1 will not be diminished due to the base currents drawn by Q1 and Q2. As such, the base-current mirror stage 604 may be said to generate currents that compensate for the base currents drawn by Q1 and Q2.

As shown in FIGS. 6A-6B, the base-current mirror stage 604 has a first leg comprising pMOS transistor device MP1 (which is the same size as MP3 and MP4) connected in series with npn-type bipolar transistor device Q3 (which is the same size as Q1). As such, the current flowing through the first leg of the base-current mirror stage 604 mirrors the currents flowing through the two legs of the amplifier stage 606.

A second leg in the base-current mirror stage 604 includes the pMOS device MP2, where that second leg is connected to the base node b3 of device Q3, such that the base current for Q3 is provided by that second leg. The second leg also includes the nMOS device MN_b3_ls which acts as a common-gate amplifier and decouples the gate of pMOS device MP2 and the base node b3 of device Q3. The current through that second leg is mirrored in third and fourth legs of the base-current mirror stage 604. The third leg comprises pMOS transistor device MP7 and generates the current applied to the base node b1 of the device Q1 in the amplifier stage 606, while the fourth leg comprises pMOS transistor device MP8 and generates the current applied to the base node b2 of the device Q2 in the amplifier stage 606, where the sizes of MP7 and MP8 are the same as for MP2. In this way, the base-current mirror stage 604 generates appropriate levels of base current for Q1 and Q2, such that the base-node voltage levels $V_{b1}$ and $V_{b2}$ applied across the resistor R1 in the gain stage 608 are not disturbed by those base currents.

Given the architecture of the final stage 610, the PTAT voltage $V_{ptat}$ can be expressed according to Equation (8) as follows:

$$V_{ptat} = \Delta V_{BE} * \frac{R_1 + R_2 + R_3}{R_1}, \quad (8)$$

where $R_1$, $R_2$, and $R_3$ are the resistances of resistors R1, R2, and R3, respectively. Example values of $R_1$, $R_2$, and $R_3$ are 0.795 Kohm, 1.59 Kohm, and 28.62 Kohm, respectively.

Substituting Equations (1), (2), and (8) into Equation (7) yields Equation (9) as follows:

$$\frac{dVramp}{dt} = \frac{k*\ln(m)*(R_1+R_2+R_3)*f*C_1}{q*R_1*C_2}*T. \quad (9)$$

Thus, according to Equation (9), the rate $$\frac{dVramp}{dt}$$

of change or the ramp voltage Vramp generated by the ramp generator 214 of FIG. 2 is a linear function of the temperature and a constant. Note that, although the individual resistance and capacitance levels may vary with temperature, their ratios should be substantially constant with temperature.

Moreover, the rate $$\frac{dVramp}{dt}$$

of change of the temperature-dependent ramp voltage Vramp is substantially independent of both (i) process variations from chip to chip of the same IC design and (ii) supply voltage variations over time for the present chip. In particular, although individual resistance and capacitance values depend on process variations, it is known that the ratios of both resistance values and capacitance values are substantially independent of process variations. Since both resistance values and capacitance values appear as ratios in Equation (9), the rate $$\frac{dVramp}{dt}$$

of change of the ramp voltage Vramp is substantially constant with process. In order to achieve independence from supply voltage variations (i.e., supply noise rejection), cascode transistors have been employed.

The PTAT generator 212 has less variation in the output PTAT voltage Vptat than a comparable implementation of the prior-art PTAT generator 100 of FIG. 1 would have in the presence of mismatch effects such as random variations in transistor widths, lengths, threshold voltages, mobilities, etc. This reduced variation results from the PTAT generator 212 employing the $\Delta V_{BE}$-generating npn input pair Q1 and Q2 as the amplifier input stage rather than using a conventional opamp with an MOS input stage. As a result of this greater linearity, depending on the particular application, the on-die temperature sensor 200 of FIG. 2 might need to be trimmed only at room temperature, while, for the same application, a temperature sensor based on the conventional PTAT generator 100 of FIG. 1 might need to be trimmed at high and low temperatures in addition to being trimmed at room temperature.

Furthermore, the on-die temperature sensor 200 of FIG. 2 does not rely on an A/D converter and therefore can be implemented in an integrated circuit where the provision of such an A/D converter would be disadvantageous.

Note that it is not required to have the current reference stage 612 of FIG. 6B provide a reference current bias to the PTAT generator 212. In alternative implementations, the PTAT generator 212 can be made self-biased, wherein the PTAT current flowing in the final stage 610 is used to bias the PTAT generator 212 by employing a current mirror that mirrors the current flowing in the transistor MP6 of the final stage 610.

Figure 7:
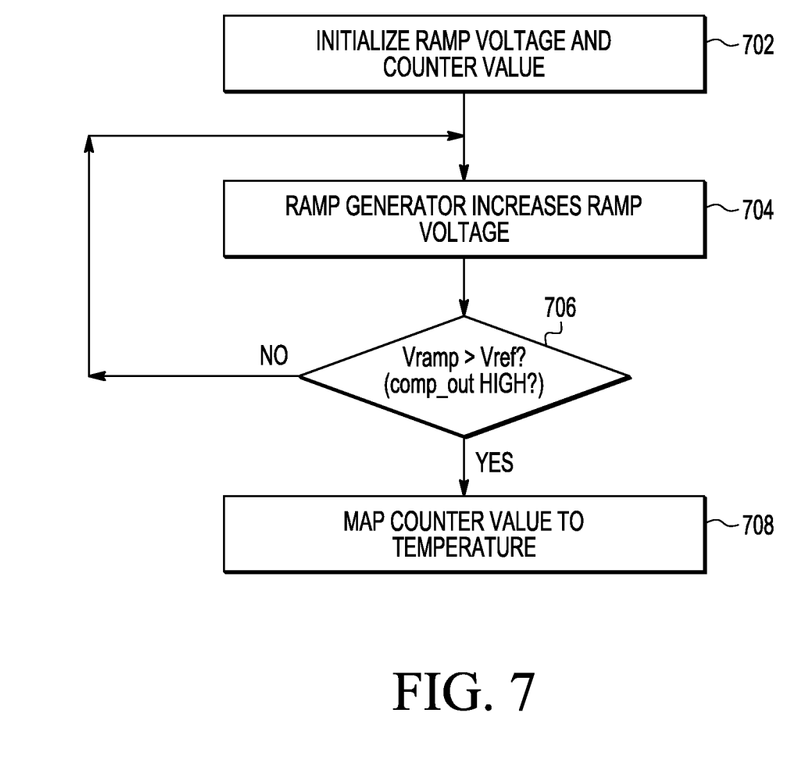
FIG. 7 is a flow chart of processing implemented by the on-die temperature sensor of FIG. 2.

FIG. 7 is a flow diagram of the processing implemented by the on-die temperature sensor 200 of FIG. 2 to measure temperature during a temperature-measurement session having a beginning and an end, according to one embodiment. In step 702, the ramp voltage Vramp is driven to ground by turning on the device MN3 of FIG. 5, and the digital value Count_out is initialized to zero. In step 704, the device MN3 is turned off, thereby allowing the ramp generator 214 to increase the ramp voltage Vramp at the voltage-change rate $$\frac{dVramp}{dt},$$

which is based on the PTAT voltage $V_{ptat}$ generated by PTAT generator 212.

In step 706, the comparator 218 determines whether or not the ramp voltage Vramp has reached and just exceeded the reference voltage Vref (in which case, the output of the comparator 218 will be high (i.e., dvdd)). If not, then processing returns to step 704 allowing the ramp voltage Vramp to continue to rise. If the comparator 218 determines that the ramp voltage Vramp has reached and just exceeded the reference voltage Vref in step 706, then the end of the temperature-measurement session has been detected, and processing continues to step 708, where the digital value Count_out is mapped to a measured temperature value.

The invention has been described in the context of the on-die temperature sensor 200 of FIG. 2 having the ramp generator 214, which generates a rising ramp voltage Vramp. In alternative embodiments, an on-die temperature sensor can be implemented with a suitable ramp generator that generates a falling ramp voltage Vramp. In that case, the ramp generator would have a pull-up device to the power supply voltage (instead of the pull-down device MN3 of FIG. 5), and the reference voltage Vref would be referenced to the power supply voltage (instead of to ground). The design of the comparator would also need to be appropriately changed.

Note that, in an alternative embodiment of an on-die temperature sensor, the PTAT generator 212 of FIGS. 6A-6B can be configured with an A/D converter. According to this embodiment, the analog PTAT voltage $V_{ptat}$ generated by the PTAT generator 212 is applied to the A/D converter, which generates a corresponding digital value that can then be mapped to a temperature value using a suitable LUT. There may also be other applications for the PTAT generator 212 of FIGS. 6A-6B other than in on-die temperature sensors. For example, the PTAT generator 212 can be used as a current reference circuit to provide a PTAT current.

Similarly, another alternative embodiment of an on-die temperature sensor can be implemented by (i) substituting a different, suitable PTAT generator, such as the prior art PTAT generator 100 of FIG. 1, for the PTAT generator 212 of FIGS. 6A-6B and/or by (ii) substituting a different, suitable ramp generator for the switched-capacitor ramp generator 214 of FIG. 5.

For purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Also, for purposes of this disclosure, it is understood that all gates are powered from a fixed-voltage power domain (or domains) and ground unless shown otherwise. Accordingly, all digital signals generally have voltages that range from approximately ground potential to that of one of the power domains and transition (slew) quickly. However and unless stated otherwise, ground may be considered a power source having a voltage of approximately zero volts, and a power source having any desired voltage may be substituted for ground. Therefore, all gates may be powered by at least two power sources, with the attendant digital signals therefrom having voltages that range between the approximate voltages of the power sources.

Signals and corresponding terminals, nodes, ports, or paths may be referred to by the same name and are interchangeable for purposes here.

Transistors are typically shown as single devices for illustrative purposes. However, it is understood by those with skill in the art that transistors will have various sizes (e.g., gate width and length) and characteristics (e.g., threshold voltage, gain, etc.) and may consist of multiple transistors coupled in series and parallel to get desired electrical characteristics from the combination. Further, the illustrated transistors may be composite transistors.

As used in this specification and claims, the term "channel node" refers generically to either the source or drain of a metal-oxide semiconductor (MOS) transistor device (also referred to as a MOSFET), the term "channel" refers to the path through the device between the source and the drain, and the term "control node" refers generically to the gate of the MOSFET. Similarly, as used in the claims, the terms "source," "drain," and "gate" should be understood to refer either to the source, drain, and gate of a MOSFET or to the emitter, collector, and base of a bi-polar device if an embodiment of the invention is implemented using bi-polar transistor technology.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The invention claimed is:

1. An article of manufacture comprising a temperature sensor that measures temperature during a temperature-measurement session, the temperature sensor comprising:
 a PTAT (proportional to absolute temperature) generator that generates an analog PTAT voltage that is dependent on the temperature;
 a ramp generator that generates a changing, analog ramp voltage whose rate of change is dependent on the PTAT voltage, such that the rate of change of the ramp voltage is dependent on the temperature;
 a comparator that compares the ramp voltage to a reference voltage to detect termination of the temperature-measurement session; and
 a counter that generates a count value based on duration of the temperature-measurement session, where the count value indicates the measured temperature,
 wherein the PTAT generator comprises:
  an amplifier stage having an input stage that comprises differently sized first and second npn transistors whose emitters are tied together such that their respective first and second base voltages have different levels; and
  an output stage comprising first, second and third resistors, wherein (i) the first resistor is connected between the second and third resistors, (ii) the first and second base voltages are applied across the first resistor, and (iii) the output stage generates the PTAT voltage based on current flowing through the first resistor.

2. The article of claim 1, wherein the temperature sensor further comprises a digital processor that maps the count value to the measured temperature based on a stored look-up table.

3. The article of claim 1, wherein the ramp generator is a switched-capacitor ramp generator.

4. The article of claim 1, wherein the rate of change of the ramp voltage is further dependent on other parameters that are independent of the temperature.

5. The article of claim 1, wherein the amplifier stage further comprises:
- a first leg comprising the first npn transistor connected in series with a first MOS transistor; and
- a second leg comprising the second npn transistor connected in series with a second MOS transistor, wherein the first and second MOS transistors are mirror-connected such that currents flowing in the first and second legs are substantially equal.

6. The article of claim 1, wherein the temperature sensor is implemented without an analog-to-digital converter.

7. The article of claim 1, wherein the temperature sensor is implemented on an integrated circuit having other circuitry.

8. An integrated circuit die including an on-chip temperature sensor, wherein the temperature sensor comprises:
- a PTAT (proportional to absolute temperature) generator that generates an analog PTAT voltage that is dependent on the temperature of the die;
- a ramp generator that generates an analog ramp voltage having a rate of change that is dependent on the PTAT voltage, such that the rate of change of the ramp voltage is dependent on the temperature;
- a comparator that compares the ramp voltage to a reference voltage to detect an end of a temperature-measurement session; and
- a counter that generates a count value based on a duration of the temperature-measurement session, where the count value indicates the measured temperature, wherein the PTAT generator further comprises:
- an amplifier stage having an input stage that comprises differently sized first and second npn transistors whose emitters are tied together such that their respective first and second base voltages have different levels;
- an output stage that generates the PTAT voltage based on current flowing through a first resistor having the first and second base voltages applied across the first resistor; and
- a base-current mirror stage that generates base currents for the first and second npn transistors such that the first and second base voltages applied across the first resistor are not substantially affected by the first and second base currents of the first and second npn transistors.

9. The article of claim 8, wherein the base-current mirror stage comprises:
- a first leg comprising a third MOS transistor connected to mirror current in the amplifier stage and connected in series with a third npn transistor that generates a third base current proportional to at least one of the first and second base currents;
- a second leg connected to generate the third base current;
- a third leg connected to generate the first base current for the first npn transistor based on the third base current; and
- a fourth leg connected to generate the second base current for the second npn transistor based on the third base current.

10. An integrated circuit die including an on-chip temperature sensor, wherein the temperature sensor comprises:
- a PTAT (proportional to absolute temperature) generator that generates an analog PTAT voltage that is dependent on the temperature of the die;
- a ramp generator that generates an analog ramp voltage having a rate of change that is dependent on the PTAT voltage, such that the rate of change of the ramp voltage is dependent on the temperature;
- a comparator that compares the ramp voltage to a reference voltage to detect an end of a temperature-measurement session;
- a counter that generates a count value based on a duration of the temperature-measurement session, where the count value indicates the measured temperature; and
- a digital processor that maps the count value to the measured temperature based on a stored look-up table;

wherein:
the ramp generator is a switched-capacitor ramp generator;
the rate of change of the ramp voltage is further dependent on other parameters that are independent of the temperature; and
the PTAT generator comprises:
- an amplifier stage comprising an amplifier and an input stage, the input stage comprising differently sized first and second npn transistors whose emitters are tied together such that their respective first and second base voltages have different levels, wherein the amplifier comprises:
  - a first leg comprising the first npn transistor connected in series with a first MOS transistor; and
  - a second leg comprising the second npn transistor connected in series with a second MOS transistor, wherein the first and second MOS transistors are mirror-connected such that currents flowing in the first and second legs are substantially equal;
- an output stage that generates the PTAT voltage based on current flowing through a first resistor having the first and second base voltages applied across the first resistor, wherein the output stage further comprises second and third resistors, wherein the first resistor is connected between the second and third resistors; and
- a base-current mirror stage that generates base currents for the first and second npn transistors such that the first and second base voltages applied across the first resistor are not substantially affected by the first and second base currents of the first and second npn transistors, wherein the base-current mirror stage comprises:
  - a first leg comprising a third MOS transistor device connected to mirror current in the amplifier stage and connected in series with a third npn transistor device that generates a third base current proportional to at least one of the first and second base currents;
  - a second leg connected to generate the third base current;
  - a third leg connected to generate the first base current for the first npn device based on the third base current; and a fourth leg connected to generate the second base current for the second npn device based on the third base current.

\* \* \* \* \*